(12) United States Patent
Litvin et al.

(10) Patent No.: US 7,631,046 B2
(45) Date of Patent: Dec. 8, 2009

(54) METHOD AND APPARATUS FOR LAWFUL INTERCEPTION OF WEB BASED MESSAGING COMMUNICATION

(75) Inventors: Daphna Litvin, Tal Shahar (IL); Adam Weinberg, Netanya (IL)

(73) Assignee: Nice Systems, Ltd., Raanana (IL)

( * ) Notice: Subject to any disclaimer, the term of this patent is extended or adjusted under 35 U.S.C. 154(b) by 0 days.

(21) Appl. No.: 11/553,096

(22) Filed: Oct. 26, 2006

(65) Prior Publication Data

US 2008/0148397 A1    Jun. 19, 2008

(51) Int. Cl.
G06F 15/16    (2006.01)
(52) U.S. Cl. ..................................... 709/206
(58) Field of Classification Search ........... 709/206; 726/22; 706/45
See application file for complete search history.

(56) References Cited

U.S. PATENT DOCUMENTS

| | | |
|---|---|---|
| 4,145,715 A | 3/1979 | Clever |
| 4,527,151 A | 7/1985 | Byrne |
| 5,051,827 A | 9/1991 | Fairhurst |
| 5,091,780 A | 2/1992 | Wixson et al. |
| 5,303,045 A | 4/1994 | Richards et al. |
| 5,307,170 A | 4/1994 | Itsumi et al. |
| 5,353,168 A | 10/1994 | Crick |
| 5,404,170 A | 4/1995 | Keating |
| 5,491,511 A | 2/1996 | Odle |
| 5,519,446 A | 5/1996 | Lee |
| 5,734,441 A | 3/1998 | Kondo et al. |
| 5,742,349 A | 4/1998 | Choi et al. |
| 5,751,346 A | 5/1998 | Mitchell et al. |
| 5,790,096 A | 8/1998 | Hill, Jr. |
| 5,796,439 A | 8/1998 | Hewett et al. |
| 5,895,453 A | 4/1999 | Cook et al. |
| 5,920,338 A | 7/1999 | Katz |
| 6,014,647 A | 1/2000 | Nizzar et al. |
| 6,028,626 A | 2/2000 | Aviv et al. |
| 6,031,573 A | 2/2000 | MacCormack et al. |
| 6,037,991 A | 3/2000 | Thro et al. |
| 6,070,142 A | 5/2000 | McDonough et al. |
| 6,081,606 A | 6/2000 | Hansen et al. |
| 6,092,197 A | 7/2000 | Coueignoux |

(Continued)

FOREIGN PATENT DOCUMENTS

DE    10358333    7/2005

(Continued)

OTHER PUBLICATIONS

Frederic Bimbot et al—A Tutorial on Text-Independent Speaker Verification EURASIP Journal on Applied Signal Processing 2004:4, 430-451.

(Continued)

Primary Examiner—Andrew Caldwell
Assistant Examiner—Jason Recek
(74) Attorney, Agent, or Firm—Ohlandt, Greeley, Ruggiero & Perle, L.L.P.

(57) ABSTRACT

A method and apparatus for web based mail lawful interception. The method and apparatus enable the detection and automatic analysis of web based mail interactions out of all intercepted web pages. The method and apparatus use and possibly generate scripts for identifying a web page as comprising a web mail message, and scripts for analyzing the web mail messages.

48 Claims, 6 Drawing Sheets

U.S. PATENT DOCUMENTS

| | | | |
|---|---|---|---|
| 6,094,227 | A | 7/2000 | Guimier |
| 6,111,610 | A | 8/2000 | Faroudja |
| 6,134,530 | A | 10/2000 | Bunting et al. |
| 6,138,139 | A | 10/2000 | Beck et al. |
| 6,167,395 | A | 12/2000 | Beck et al. |
| 6,170,011 | B1 | 1/2001 | Beck et al. |
| 6,212,178 | B1 | 4/2001 | Beck |
| 6,230,197 | B1 | 5/2001 | Beck et al. |
| 6,295,367 | B1 | 9/2001 | Crabtree et al. |
| 6,327,343 | B1 | 12/2001 | Epstein et al. |
| 6,330,025 | B1 | 12/2001 | Arazi et al. |
| 6,345,305 | B1 | 2/2002 | Beck et al. |
| 6,427,137 | B2 | 7/2002 | Petrushin |
| 6,549,613 | B1 | 4/2003 | Dikmen |
| 6,570,608 | B1 | 5/2003 | Tserng |
| 6,604,108 | B1 | 8/2003 | Nitahara |
| 6,628,835 | B1 | 9/2003 | Brill et al. |
| 6,704,409 | B1 | 3/2004 | Dilip et al. |
| 6,996,845 | B1 * | 2/2006 | Hurst et al. .................... 726/25 |
| 7,039,577 | B1 * | 5/2006 | Fingerhut et al. ............ 703/21 |
| 7,076,427 | B2 | 7/2006 | Scarano et al. |
| 7,103,806 | B1 | 9/2006 | Horvitz |
| 2001/0052081 | A1 | 12/2001 | McKibben et al. |
| 2002/0005898 | A1 | 1/2002 | Kawada et al. |
| 2002/0010705 | A1 | 1/2002 | Park et al. |
| 2002/0059283 | A1 | 5/2002 | Shapiro et al. |
| 2002/0087385 | A1 | 7/2002 | Vincent |
| 2003/0033145 | A1 | 2/2003 | Petrushin |
| 2003/0059016 | A1 | 3/2003 | Lieberman et al. |
| 2003/0163360 | A1 | 8/2003 | Galvin |
| 2003/0187976 | A1 * | 10/2003 | Decime ...................... 709/224 |
| 2004/0098295 | A1 | 5/2004 | Sarlay et al. |
| 2004/0141508 | A1 | 7/2004 | Schoeneberger et al. |
| 2004/0161133 | A1 | 8/2004 | Elazar et al. |
| 2004/0249650 | A1 | 12/2004 | Freedman et al. |
| 2005/0246440 | A1 * | 11/2005 | Yu ............................. 709/225 |
| 2005/0289181 | A1 * | 12/2005 | Deninger et al. ......... 707/104.1 |
| 2006/0093135 | A1 | 5/2006 | Fiatal et al. |
| 2006/0150249 | A1 * | 7/2006 | Gassen et al. ................. 726/23 |
| 2007/0153689 | A1 * | 7/2007 | Strub et al. ................. 370/230 |

FOREIGN PATENT DOCUMENTS

| | | |
|---|---|---|
| EP | 1 484 892 | 8/2004 |
| WO | WO 95 29470 A | 11/1995 |
| WO | WO 98 01838 A | 1/1998 |
| WO | WO 00/73996 | 12/2000 |
| WO | WO 02/37856 | 5/2002 |
| WO | WO 03 013113 A2 | 2/2003 |
| WO | WO 03 067360 A2 | 8/2003 |
| WO | WO 03 067884 A1 | 8/2003 |
| WO | WO 2004 091250 | 10/2004 |

OTHER PUBLICATIONS

Yeshwant K. Muthusamy et al—Reviewing Automatic Language Identification IEEE Signal Processing Magazine 33-41.

Marc A. Zissman—Comparison of Four Approaches to Automatic Language Identification of Telephone Speech IEEE Transactions on Speech and Audio Processing, vol. 4, 31-44.

NiceVision—Secure your Vision, a prospect by NICE Systems, Ltd.

A Data—Warehouse / OLAP Framework for Scalable Telecommunication Tandem Traffic Analysis—Qiming Chen, Meichun Hsu, Umesh Dayal-qchen,mhsu,dayal@hpl.com.

NICE Systems announces New Aviation Security Initiative, reprinted from Security Technology & Design.

(Hebrew) "the Camera That Never Sleeps" from Yediot Aharonot.

Freedman, I. Closing the Contact Center Quality Loop with Customer Experience Management, Customer Interaction Solutions, vol. 19, No. 9, Mar. 2001.

PR Newswire, NICE Redefines Customer Interactions with Launch of Customer Experience Management, Jun. 13, 2000.

PR Newswire, Recognition Systems and Hyperion to Provide Closed Loop CRM Analytic Applications, Nov. 17, 1999.

Financial companies want to turn regulatory burden into competitive advantage, Feb. 24, 2003, printed from Information Week, http://www.informationweek.com/story/IWK20030223S0002.

Sedor-Internet pages form http://www.dallmeier-electronic.com.

(Hebrew) print from Haaretz, "The Computer at the Other End of the Line", Feb. 17, 2002.

Article Sertainty—Automated Quality Monitoring—SER Solutions, Inc.-21680 Ridgetop Circle Dulles, VA—WWW.ser.com.

Article Sertainty—Agent Performance Optimization—2005 SE Solutions, Inc.

Lawrence P. Mark SER—White Paper—Sertainty Quality Assurance—2003-2005 SER Solutions Inc.

Douglas A. Reynolds Robust Text Independent Speaker Identification Using Gaussian Mixture Speaker Models—IEEE Transactions on Speech and Audio Processing, vol. 3, No. 1, Jan. 1995.

Chaudhari, Navratil, Ramaswamy, and Maes Very Large Population Text-Independent Speaker Identification Using Transformation Enhanced Multi-Grained Models—Upendra V. Chaudhari, Jiri Navratil, Ganesh N. Ramaswamy, and Stephane H. Maes-IBM T.j. Watson Research Centre—Oct. 2000.

Douglas A. Reynolds, Thomas F. Quatieri, Robert B. Dunn Speaker Verification Using Adapted Gaussian Mixture Models—Oct. 1, 2000.

Yaniv Zigel and Moshe Wasserblat—How to deal with multiple-targets in speaker identification systems?

A tutorial on text-independent speaker verification—Frederic Bimbot, Jean Bonastre, Corinn Fredouille, Guillaume Gravier, Ivan Chagnolleau, Sylvian Meigner, Teva Merlin, Javier Ortega Garcia, Dijana Deacretaz, Douglas Reynolds—Aug. 8, 2003.

Yeshwant K. Muthusamy et al—Reviewing Automatic Language Identification IEEE Signal Processing Magazine 33-41.

Marc A. Zissman—Comparison of Four Approaches to Automatic Language Identification of Telephone Speech IEEE Transactions on Speech and Audio Processing, vol. 4, 31-44.

Towards an Automatic Classification Of Emotions in Speech—N. Amir. S. Ron.

Robust Text Independent Speaker Identification Using Gaussian Mixture Speaker Models.

* cited by examiner

1. URL contains the one of the following words:
   *mail*
   *message*                                              250

Score= 6 points

2. Form parameters or values contain one of the following:
   Send,
   SendMail,
   Send_Mail,                                             260
   SendMessage Score= 3 points 3. Form parameters or values contain one of the following:
   Subject,
   mailsbj,
   headersubject,                                         270
   Subj Score= 3 points 3. Form parameters or values contain one of the following:
   To,
   Bcc,
   mailto,                                                280
   composeto…

Score= 1 point

First Threshold = 5 points                               290
Second Threshold = 8 points

FIG. 2

```
// Site and transaction identification:
"HostName"="mail.yahoo.com"
"BodyFinField"="order"                                          310
"BodyFinVal"="down"
"AttachFinField"="download, viewing"
"AttachFinVal"="1,1"

// Mail Body and Header parsing:
"BodyContentType"="text/html"                                   320
"SubjectCharset"="us-ascii"
"MailMethod"="html"

// Definition of the html structure of the "Body" section:
"BodyTag"="div"                                                 330
"BodyAttr"="id"
"BodyValue"="message"

// Definition of the html structure of the "Header" section:
"HeaderTag"="table"
"HeaderAttr"="class"                                            340
"HeaderValue"="messageheader"
"HeaderDelimiter"="td"

// /Definition of the parameters in the "Header" section:
"From"="From:"
"Subject"="Subject:"                                            350
"To"="To:"
"CC"="CC:"
"SentTime"="Date:"

// Attachment parsing:
"AttachFinField"="download,viewimg"                             360
"AttachFinVal"="1,1"
"AttachIDParamDelimiter"=""
"AttachIDParamNum"=dword:00000001

// Aggregation parameters:
"AttachID"="MsgId"                                              370
"BodyAttachID"="MsgId"
```

FIG. 4

```
// Site and transaction identification:
"HostName"="mail.yahoo.com"
"SendField"="SEND"                                    510
"SendVal"="1"
"DraftField"="SD"
"DraftVal"="Save as a Draft"

// Mail Body and Header parsing:
"FromFieldName"=""
"ToFieldName"="To"                                    520
"CcFieldName"="Cc"
"BccFieldName"="Bcc"
"SubjectFieldName"="Subj"
"BodyFieldName"="Body"
"BodyContentType"="text/plain"

// Attachment parsing:
"AttachFieldName"="userFile*"                         530

// Aggregation parameters:
"AttachLinkType"="FileName"
"AttachID"="AttData"                                  540
"BodyAttachID"="AttData"
"AttachDelimiter"="*DMAF*"
"ParamDelimiter"="*DMAI*"
"ParamNum"=dword:00000001
```

FIG. 5

METHOD AND APPARATUS FOR LAWFUL INTERCEPTION OF WEB BASED MESSAGING COMMUNICATION

BACKGROUND OF THE INVENTION

1. Field of the Invention

The present invention relates to a method and apparatus for lawful interception in general, and to intercepting web based messaging communication in particular.

2. Discussion of the Related Art

Lawful interception (LI) is generally aimed at capturing and analyzing as many as possible relevant communications of a target. A target can be a person, group of persons, an institute and the like, known to the organization and possibly posing a hazard to the organization or to society. The communications preferably include incoming and outgoing communications performed by or among one or more targets. Intercepted communications traditionally included mainly analog and digital voice communications. However, as larger parts of current communications are diverted to electronic channels in general, and to web based messaging communication (WBMC) in particular, the ability to automatically detect, capture and analyze such interactions becomes critical for law enforcement institutions and agencies. WBMC refers to all currently known forms, or forms that will become known in the future of communication between two or more users aimed at transmitting messages or information, which is materialized via the World Wide Web (WWW), including but not limited to web-mail, Newsgroups, Instant Messaging, chats, forums and others. WBMC interception is considered to be one of the more important sources for LI in data networks or IP networks.

Web-based communications passively captured by a law enforcement agency generally contain a majority of generally-available web pages which are of no particular interest to the agency. However, the agency is mainly interested in those pages that represent web based messaging communications. Nevertheless, automatically identifying web pages as WBMC, and analyzing them poses a challenge. WBMC can assume multiple forms as mentioned above. In addition, every such form can employ different formats and structures. For example, two sites providing mail services can have a completely different look and feel. Additionally, each service enables a user to send messages or information to a specific user or to an open community and to receive messages or information which is either directed specifically to the user, or to the open community, wherein the formats of sending or receiving messages is typically different.

Therefore, implementing an efficient and flexible LI capability, consisting of automatically recognizing and analyzing multiple forms of WBMC is not enabled with current technologies, due to the large variety of WBMC applications, formats and protocols, many of which are proprietary.

Adding to the complexity is the fact that new applications and updates to existing applications are continuously generated, making LI tools developed to cope with known applications practically insufficient or even useless.

Yet another complexity stems from the constant and frequent changes in available WBMC services, including adding, removing, or modifying such services, or merely changing their internet addresses, as expressed as Uniform Resource locators (URLs). Thus, there is a great difficulty in identifying a messaging communication, out of all the web-based intercepted communication.

Yet further complexity is caused by the different protocols and combinations thereof used to send or transmit mail messages. For example, attachments to web mail are preferably sent via file download/upload mechanisms, while the message header is locally built on the receiving side by JavaScript, and the message body is HTML.

There is therefore a need in the art for a method and apparatus for enabling efficient interception and analysis of WBMC. The method and apparatus should be able to cope with constantly changing applications, URLs, formats and other parameters associated with WBMC services.

SUMMARY OF THE PRESENT INVENTION

It is an object of the present invention to provide a novel method and apparatus for detecting and analyzing intercepted web based messaging communications.

There is thus provided in accordance with a preferred embodiment of the disclosed invention a method for the interception and analysis of one or more web based messaging communications, the method comprising the steps of: receiving a detection scheme for detecting whether a HTTP content item represents a web based messaging communication; and receiving an analysis scheme for analyzing one or more web based messaging communications. Within the method, the HTTP content item is optionally a web page, or an uploaded parameter. The web based messaging communication is optionally sent, received, a saved draft, or a retrieved draft. Optionally, the method comprises a step of generating the detection scheme or the analysis scheme. The detection scheme can be a detection script of a detection configuration file. The analysis scheme can be an analysis script or an analysis configuration file. The detection scheme optionally comprises one or more rules for identifying an address as associated with the web based messaging communication. The address is optionally a Uniform Resource Locator, a host name or an IP address. Within the method, the analysis scheme can contain an association of a part of a HTTP message representing a web based messaging communication with a string. The part of the HTTP message can relate to one or more of the group consisting of: a "TO" field, a "FROM" field, a "SUBJECT" field, a "CC" field, a "BCC" field, a "NICKNAME" field, a "USERID" field, a "ATTACHMENT" field, a "BUDDIES" field or any similar fields. The method optionally comprises a step of intercepting one or more parts of a web based messaging communication. The method optionally comprises a step of detecting according to the detection scheme whether a web page represents a web based messaging communication. The method can comprise a step of detecting according to the detection scheme whether an uploaded parameter represents a web based messaging communication. Optionally, the method comprises a step of parsing a part of a web based messaging communication according to the analysis scheme. The method can further comprise a step of extracting an association of a unique user ID with a nick name. The unique user ID can be an e-mail address or a messenger UID or other similar unique user ID. Optionally, the method comprises a step of emulating a server for presenting the web based messaging communication. The method can further comprise a step of intercepting a detail selected from the group consisting of: user name, login name, and password. Optionally, the method comprises a step of denoting a parameter as an indication for aggregation of at least two components of the web based messaging communication.

Another aspect of the disclosed invention relates to an apparatus for interception and analysis of one or more web based messaging communications, the apparatus comprising: an address list repository; a web based messaging communication detection scheme repository for storing a web based messaging communication detection scheme; and a web based messaging communication detection engine. Within the apparatus, the one web based messaging communication can be sent, received, a saved draft or a retrieved draft. The address list repository optionally stores one or more Uniform Resource Locators, or one or more host names or one or more IP addresses, or any other unique identifier. The web based messaging communication detection scheme is optionally a script or a configuration file. The method optionally comprises a web based messaging communication analysis repository and a web based messaging communication analysis engine. Within the apparatus the web based messaging communication analysis repository comprises a web based messaging communication analysis scheme. The web based messaging communication analysis repository optionally comprises a web based messaging communication analysis pattern. The web based messaging communication analysis scheme is optionally a script or a configuration file. The apparatus optionally comprises a component for generating a web based messaging communication detection scheme or a web based messaging communication analysis scheme. The web based messaging communication is optionally a web mail, instant messaging, news group messaging or any other messaging service.

Yet another aspect of the disclosed invention relates to a computer readable storage medium containing a set of instructions for a general purpose computer, the set of instructions comprising: receiving a detection scheme for detecting whether a HTTP content item represents a web based messaging communication, and receiving an analysis scheme for analyzing a web based messaging communication.

BRIEF DESCRIPTION OF THE DRAWINGS

Non-limiting embodiments of the invention will be described with reference to the following description of exemplary embodiments, in conjunction with the figures. The figures are generally not shown to scale and any sizes are only meant to be exemplary and not necessarily limiting. In the figures, identical structures, elements or parts that appear in more than one figure are preferably labeled with a same or similar number in all the figures in which they appear, in which:

FIG. 2 is listing of guidelines for building a script for determining whether an HTTP communication is a mail communication, in accordance with a preferred embodiment of the disclosed invention;

FIG. 4 shows a script for analyzing the mail message shown in FIG. 3, in accordance with the preferred embodiment of the disclosed invention;

FIG. 5 shows a script for analyzing an outgoing mail message, in accordance with the preferred embodiment of the disclosed invention.

DETAILED DESCRIPTION OF THE PREFERRED EMBODIMENT

The present invention overcomes the disadvantages of the prior art by providing a novel solution which enhances and adds to the capabilities of currently available methods and systems for web based messaging communication (WBMC) lawful interception by enabling automatic or semi-automatic recognition and analysis of web pages as representing WBMC. WBMC refers to all currently known arrangements or methods, or arrangements or methods that will become known in the future, of communication between two or more users, aimed at drafting and saving a message, retrieving a draft, transmitting or receiving messages or information, which is materialized via the World Wide Web (WWW), including but not limited to web-mail. Newsgroups, Instant Messaging, chats, forums and others. A user, generally a law enforcement agency worker is offered three main phases of detection and analysis of WBMC. The recognition and analysis of each WBMC site generally involves the three stages.

At a first phase, the user lists or approves specific internet sites as being associated with web based messaging communication. At a second phase, the user defines, approves, or enhances schemes, such as rules or scripts for identifying new sites as representing WBMC, and at a third phase the user defines, approves or enhances analysis scripts or patterns for analyzing web pages associated with WBMC. Once the three stages are completed one or more sites are recognized as providing messaging services, pages from these sites are automatically captured, analyzed and presented to the user for investigation, and rules are active for recognizing further sites as providing mail services and capturing mail messages form these sites.

Figure 1:
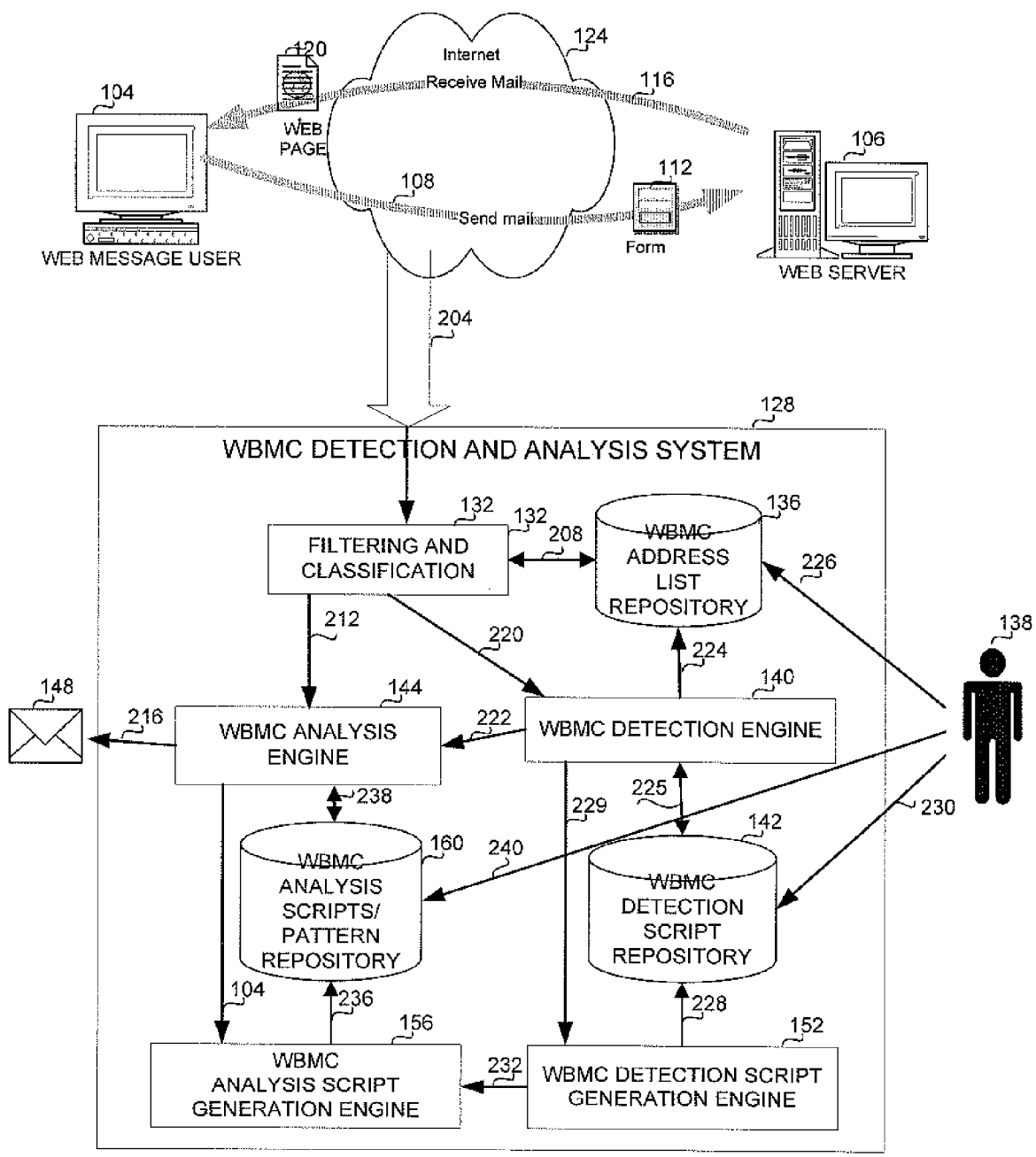
FIG. 1 is a general scheme of a preferred embodiment of the disclosed invention.

Reference is now made to FIG. 1, showing a schematic illustration of the main steps associated with the disclosed method and the main components used in an apparatus for implementing the disclosed method. The components of the system are numbered in the range of 100-199, while the steps are numbered in the 200-299 range. A web message user 104 is sending a message such as a mail 108 or receiving message such as a mail 116 through a web server 106. A mail item is typically an HTTP content item, such as a web page or an uploaded parameter. Outgoing mail is typically sent in a Form 112 referred to as uploaded parameters, and incoming mail is generally received in HTTP web page (containing HTML or XML or WML or Java script or any other similar formatted content) 120. The mails are exchanged via a network such as the Internet 124. When a law enforcement agency is passively capturing 204 communication exchanged through a web server associated with a service provider (not shown), a significant part of the exchanged communication typically consists of generally available web pages, such as web pages associated with portals, news sites or the like. The captured pages are sent to a WBMC detection and analysis system 128. The communication capturing performed at step 204 is preferably passive, i.e. all web communication is captured, rather than defining conditions, related for example to the communication time, size, content or the like, and capturing only those pages that adhere to the conditions. The captured pages are sent to a filtering and classification engine 132. Filtering and classification engine 132 first checks at step 208 whether the Uniform Resource Locator (URL) associated with the web page appears in a WEB MAIL (WM) address list repository 136. Repository 136 comprises addresses of web sites, such as URLs, host names or IP addresses previously identified as comprising WBMC. A user 138 can manually insert at step 226 one or more URLs of sites known to provide mail services to repository 136. If the captured web page indeed belongs to a site appearing in repository 136, the page is assumed to represent a WBMC, and is sent at step 212 directly to WBMC analysis engine 144, detailed below. However, since servers are dynamically activated and updated, it is generally impossible to pre-indicate all relevant addresses that provide mail services. Therefore, if the address does not appear in repository 136, it is sent at step 220 to WBMC detection engine 140. Engine 140 identifies addresses associated with web based messaging servers. For this end, engine 140 can use: a set of sites known to provide WBMC services; existing information about a specific application, such as G-mail, Yahoo! Mail, or others, in order to detect an address change of these applications; or a set of predefined rules relating to keywords or patterns, which are preferably configured per each WBMC provider. WBMC is identified based on automatic classification of specific web sessions as messaging sessions. The automatic classification is based on a set of rules defining a typical WBMC, such as, but not limited to existence of one or more keywords such as a combination of "to", "subject" and "cc", or identifying patterns between two or more web pages representing a correspondence. In yet another alternative, pages are filtered according to partial host name or URL. When a URL or a host name is detected to provide a mail service, all HTTP data transferred from or to that site will be intercepted. The interception according to host name or URL can be done according to the "Host" field of an HTTP header, by analyzing DNS responses and mapping of host names into IP Addresses, or any combination of these or similar methods. WBMC detection engine 140 checks at step 225 whether the web page adheres to any of the scripts or rules stored at WBMC detection script repository 142, which contains all the rules and scripts earlier generated or received for identifying a web page as containing WBMC. Scripts for identifying a web page as containing WBMC are optionally provided by user 138 to repository 142 at step 230. The answer provided by engine 1405 whether a web site associated with a webpage provides mail services is preferably not Yes or No, but rather a grade representing the probability that the site associated with the web page provides mail services, as based on adherence with one or more rules or scripts stored at repository 142. If the probability that the site indeed provides mail services is above a predetermined threshold, for example 70%, the web site is added at step 224 to WM URLs list repository 136. If the probability is below a second threshold, such as 20%, the web site is assumed not to be providing mail services, and the web page is possibly abandoned. However, if the grade is between the first and the second predetermined grades, a notice is possibly sent to user 138 who can confirm or disprove that the page is indeed a mail communication. Alternatively, the web page can be sent at step 229 to WBMC detection script generation engine 152. Engine 152 generates, or provides a user with tools for generating scripts for determining whether a web site provides mail services, and stores the scripts at step 228 in repository 142. The automatically generated scripts preferably undergo a supervision or enhancement by user 138. The generated scripts are stored together with the scripts generated and stored by user 138 at step 230. The scripts are preferably based on keywords or patterns as further detailed in association with FIG. 2 below. When a web page is sent to engine 152, it is sent further to WBMC analysis script generation engine 156, which generates schemes such as scripts or configuration files, or detects patterns for analyzing web pages. The generated scripts are stored in WBMC analysis scripts or pattern repository 160. Further stored in repository 160 are scripts and/or configuration files generated by user 138, and sent to repository 160 at step 240. Referring now back to step 220, wherein a web page not a-priori identified as representing web mail is sent to WBMC detection engine 140. If the web page is indeed detected to represent mail communication, either because it adhered to any of the scripts a priori stored at WBMC detection script repository 142 and the web site added to repository 136, or because it has brought about the addition of a script to repository 142, it is sent at step 222 to WBMC analysis engine 144. At step 238 engine 144 searches for relevant script or pattern in WBMC analysis scripts or pattern repository 160. If such script or pattern is found, engine 144 analyzes the web page according to the script or pattern, and the analyzed message 148 is transferred at step 216 to law enforcement evaluation. If no pattern or script is found in repository 160, the web page is transferred to WBMC analysis script generation engine 156. Engine 156 provides a user with tools for generating a script of analyzing a web page, or a tool that generates such scripts automatically and lets a user enhance, correct or otherwise change the script. The script generation is detailed in association with FIG. 3 below. If engine 156 generates a relevant script, in addition to storing the script at repository 160 at step 236, the current web page is analyzed according to the script and sent to an evaluator at step 216.

Reference is now made to FIG. 2, showing exemplary guidelines or rules for building a scheme such as a script for determining whether an HTTP communication is a mail communication. Area 250 shows words that when detected in the URL address increase the probability that the site is a mail service provider in six points. Areas 260 and 270 show exemplary lists of words, related to a sender and a subject that appear in almost any mail message, and if detected in a web page increase the probability that the page is a web mail communication in 3 points. Area 280 contain list of words related to other fields, and their presence increases the probability in 1 point. Area 290 discusses the threshold: in the shown example, if a web page received less than 5 points, it is not considered to be a mail message; if it received over 8 points, it is considered to be a mail message; and if received between 6 and 8 points, the user is notified and asked whether the page is to be considered as a mail message or not.

Scripts for detecting whether a web page represents a mail message, and for parsing and analyzing a message, its parameters, contents, attachments and aggregation parameters can be manually generated or indicated by a user, which has to reveal to the system the relevant fields in each web service (and possibly separately for incoming and outgoing messages). Alternatively, scripts can be semi-manually generated, wherein an automatic system performs some of the work, or fully automatic wherein the automatic system performs the full analysis.

Figure 3:
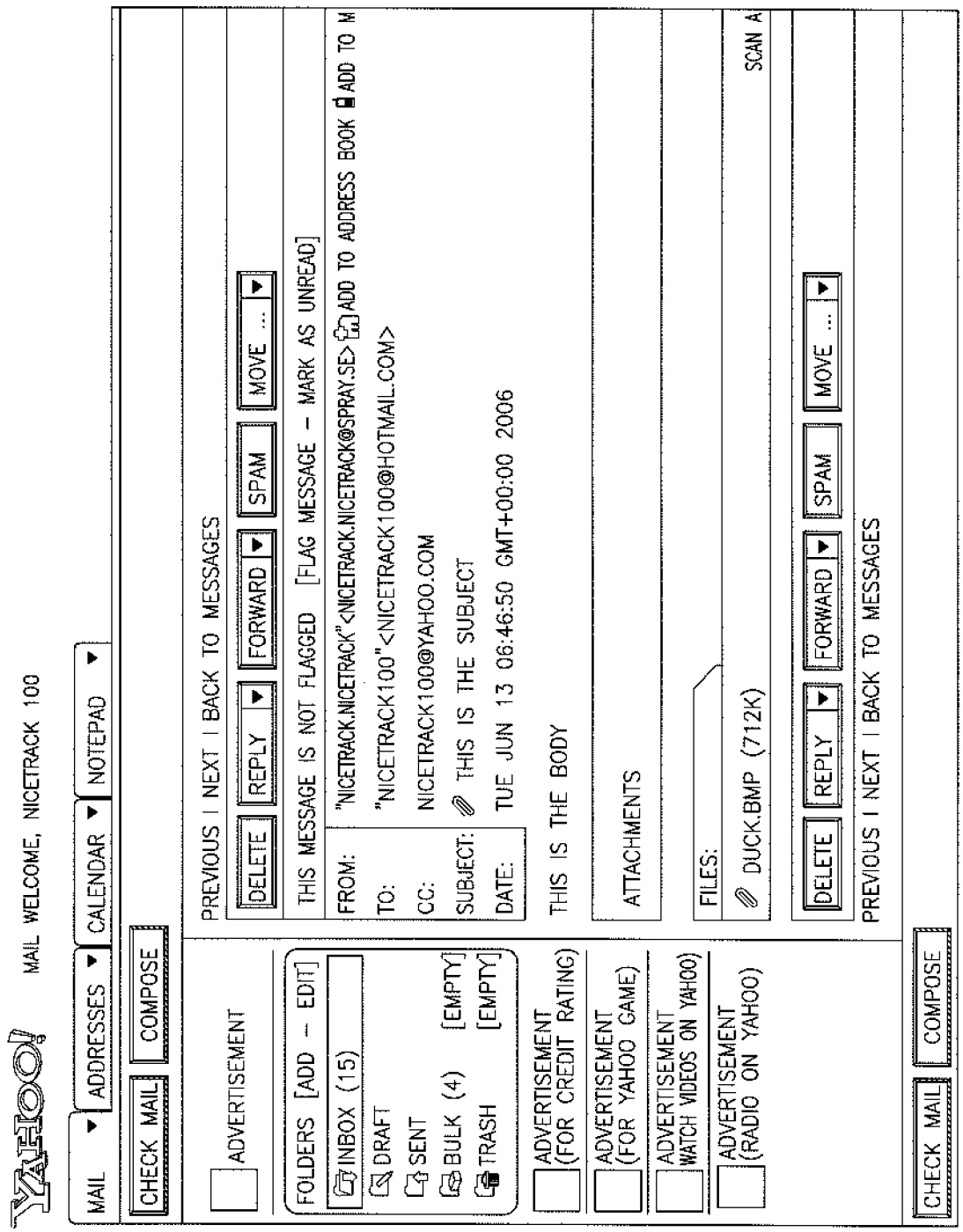
FIG. 3 shows an incoming mail message in a web service provided by Yahoo!

Reference is now made to FIGS. 3 and 4, wherein FIG. 3 shows a web page containing an incoming message received in the Yahoo! Mail system, and FIG. 4 shows a script for analyzing the message shown in FIG. 3. On each line of FIG. 4, the string on the left hand side, for example the "Host-Name" string in the "HostName"="mail.yahoo.com" line, is an internal string used for identifying the relevant part of the message in multiple environments, while the right hand side, in this case the "=mail.yahoo.com" relates to the actual value in the intercepted message and is expected to appear in intercepted message exchanged using the web service. Area 310 relates to identifying the site and transaction associated with the message. Area 320 relates to parsing the body and header, while areas 330 and 340 relate to the definitions of the html structure of the message body and the message header sections, respectively. Area 350 provides the "dictionary" for the parameters associated with the header, including fields such as "to", "from" and the like. Section 360 provides the necessary parameters for parsing attachments, while section 370 relate to aggregation parameters.

In general, scripts for analyzing a message should relate to a number of topics. The basic topic is the proprietary and possibly dynamic format used in the message, and as part of analyzing a message it is required to ensure proper decoding of the various message fields. The required decoding can use a scheme, such as a dedicated scripting language, enabling a user to define the required decoding, or a "master" configuration file that enables a user to configure the decoding. This decoding should enable the extraction of important WBMC information elements. For example, in a specific web-mail service, the subject field is identified by the "mailsbj" field name. In another example associated with a different mail service, the subject field includes an HTML path of <Table><TD>, in which the first column contains the string "Subject:" and the second column includes the subject information. In accordance with a preferred embodiment of the disclosed invention, when a user is expected to supply the script for analyzing a web mail message, he or she is preferably provided with a tool for generating the script. Such tool can provide a graphic user interface that enables a user to indicate, using a keyboard, a mouse or another input device an area of a message, and associate the area with a field which can be chosen from a list, such as a drop-down list of fields. This link will associate attributes within the message with the relevant fields. In the semi-automatic mode, a dedicated application can spare the user at least some of the work, for example by identifying straight forward fields, and let the user correct the scheme, such as the configuration file if necessary and complete the parts that the system could not handle. The application can develop over time, to incorporate knowledge gathered from analyzing multiple web services and thus ensure better performance when encountering new services. When no user intervention is required, the application is fully automatic. Another topic that should be taken care of by an analysis script is the aggregation, i.e. the division of a mail message, with or without attachments into parts. Various components of specific message can be scattered and delivered through a variety of communication techniques. For example, the message header is locally built on the receiving system using JavaScript, while the message body is regular HTML, and attachments are sent via file upload/download mechanism. Regarding this difficulty, the method utilizes schemes such as but not limited to dedicated scripting languages or configuration files to define the required WBMC method, specifically for each WBMC service provider. Yet another difficulty relates to coping with WBMC active content. When an application uses executable software code, such that only by using this software the actual contents of the WBMC becomes available to the receiver, simple decoding of the mail message does not suffice. In order to overcome this problem, the current invention identifies the parts of the message that include the software and extracts the information required for decoding of the message. The invention is aimed at, but is not limited to passive decoding of applications such as Java script, and other techniques specific for each WBMC service provider. Yet another difficulty rises when extraction of the information fails, due to high complexity or otherwise non-supported features of the employed implementation of the service. In such cases, the user is possibly notified about the incomplete extraction, and an emulated client-server environment is created, in which the server side emulates the server side of the original environment presenting the original message to the user, and enabling him or her to view and manually extract the required information.

FIG. 5 is a listing of a configuration file for parsing an outgoing message using the same web service offered by Yahoo! Area 510 relates, similarly to area 410 of FIG. 4 above, to the site and transaction parameters, area 520 relates to parsing the body and header, area 530 relates to attachments, while area 540 relates to aggregation parameters.

FIGS. 2, 4, and 5 are not intended to provide exact syntax for detecting a web mail message or for analyzing and parsing a message, but rather to demonstrate the exemplar guidelines used in building such scripts, in accordance with a preferred embodiment of the present invention. It will be apparent to a person having ordinary skill in the art that an apparatus according to the disclosed invention may act differently with web pages associated with different sites. For example, at a certain point in time the apparatus may be detecting and analyzing mail messages drafted and saved, retrieved form draft, sent or received via certain web site, while a message sent via other sites may lead to initial recognition of the associated web site as providing mail services, and only then analysis of other messages associated with the site.

Additional subjects relevant to intercepting and analyzing mail messages, relate to the usage of nick names. A mail user, typically defines one or more nicknames, such as "Mom" to indicate his or her mother's details, and then uses only the nick name "Mom" instead of the real name. This eliminates the possibility to track the e-mail address to which the message is sent. However, since a person using a web mail service sends the relevant data to the server when initially creating the nickname, if this session, or another session indicating the association between an e-mail address (or another unique user ID) and a nick name is intercepted, it will be possible to extract this association for use in further messages.

Yet another issue relates to cases wherein a user creates and saves or retrieves a draft message, even if the message is not sent to another addressee, the mere action of saving or retrieving the draft involves the server, and thus enables interception. However, draft message may be identified as being of a different type then sent or received messages, which may necessitate separate analysis. Initial creation or later usage of a login account, login name or password can also be intercepted, and can provide the law enforcement agency with the user's details, including user name or login name and password. If an encryption key is associated with the user, then when the service provider receives a warrant ordering it to provide the key to the law enforcement agency, further decoding and parsing of future communications of the subject is possible.

The present invention has been described using non-limiting detailed descriptions of embodiments thereof that are provided by way of example and are not intended to limit the scope of the invention. It should be understood that features described with respect to one embodiment may be used with other embodiments and that not all embodiments of the invention have all of the features shown in a particular figure or described with respect to one of the embodiments. It is noted that some of the above described embodiments may describe the best mode contemplated by the inventors and therefore include structure, acts or details of structures and acts that may not be essential to the invention and which are described as examples. The above discussion refers mainly to web mail, which is exemplary only. The system may be implemented to deal concurrently with a variety of WBMC types, as detailed in association with FIG. 6.

Figure 6:
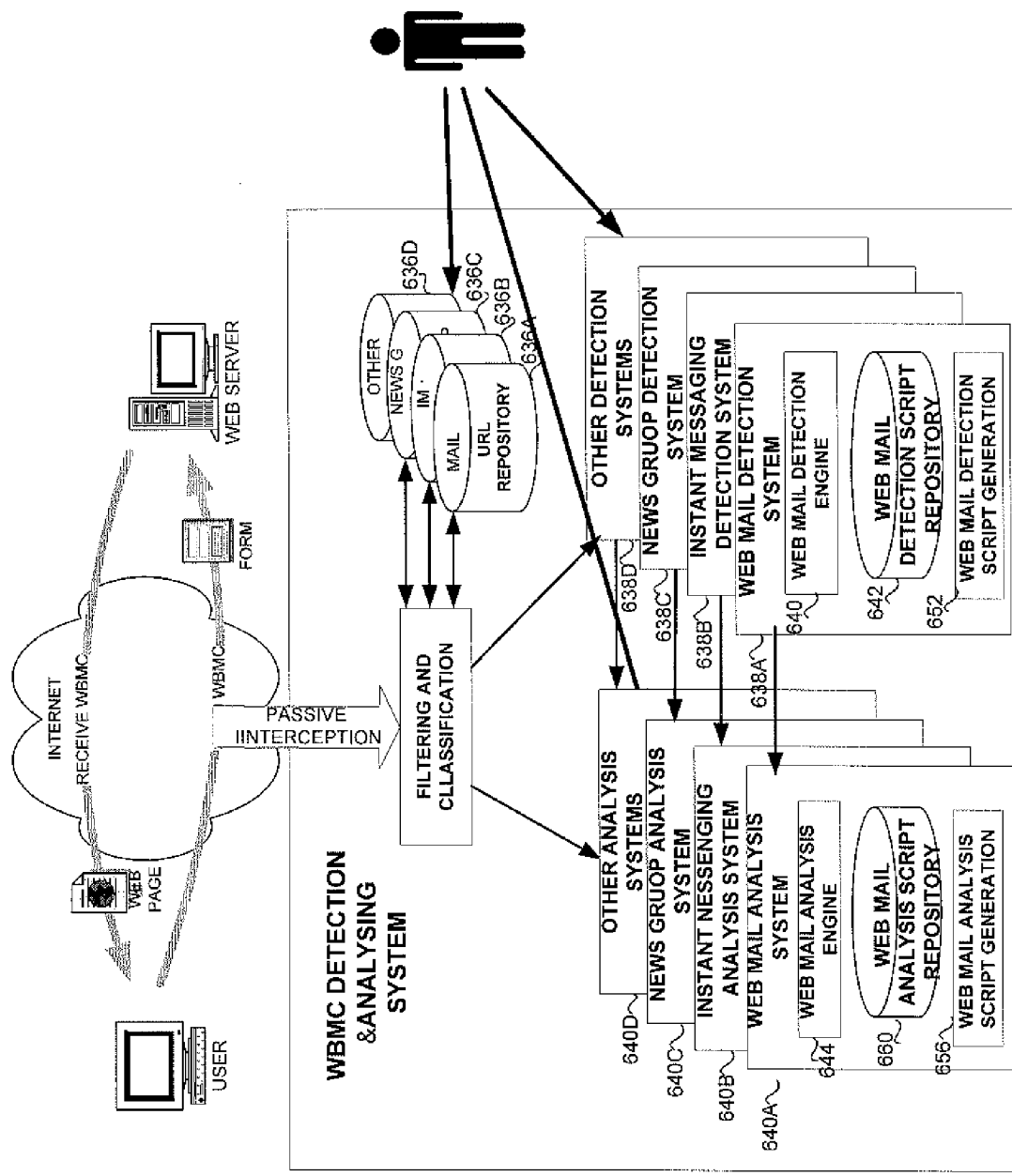
FIG. 6 shows a detailed scheme of the components for detecting and analyzing different types of web messaging, in accordance with the preferred embodiment of the disclosed invention.

Referring now to FIG. 6, showing a more detailed scheme of the scheme shown in FIG. 1. FIG. 6 shows that script repository 136 comprises mail script repository 636A, instant messaging script repository 636B, news group script repository 636C and other script repository 636D. Script repositories 636A, 636B, 636C and 636D may be implemented on a single repository such as a single database, or on separate repositories residing on the same or different storage devices. Similarly, detection engine 140, detection script repository 142 and WBMC detection script generation engine 152 of FIG. 1 are preferably implemented as separate sets of detection engine, script repository and script generation engine for each type of messaging used. Thus, for example, web mail detection system 638A comprises web mail detection engine 640, web mail detection script repository 642 and web mail detection script generation 652. Similarly, instant messaging detection system 638B, news group detection system 638C, and other detection system 638D comprise specific detection engine, script repository, and script generation engine. The same division is preferably implemented regarding WBMC analysis engine 144, WBMC script repository 160 and WBMC analysis script generation of FIG. 1 are implemented separately for each type of web messaging. Thus, web mail analysis system 640A comprises web mail analysis engine 654, web mail analysis script repository 660 and web mail analysis script generation 656. Similar structure is provided for instant messaging analysis system 640B, news group analysis system 640C or other analysis system 640D.

The apparatus described for carrying out the disclosed invention may be a system comprising of hardware and/or software. The apparatus may be implemented using a system such as programmed computers or network appliances. A programmed computer can be any type of standalone computer, network computer, comprising a CPU and memory (not shown). The methods of the present invention are preferably implemented in software, comprising executables, modules, functions, methods or other types of software components written in any computer language or running on any operating system and cooperating to carry out the methods of the disclosed invention. The repositories, including the URL repositories, the detection script repositories and the analysis repositories can be implemented using any one or more storage devices, such as a magnetic tape, a magnetic disc, an optical disc, a laser disc, a mass-storage device, or the like. The apparatus may also include various computer readable media having suitable software thereon, for example, CD-ROMs, diskettes, flash RAM or the like.

The present invention is not limited to what has been particularly shown and described hereinabove. Structure and acts described herein are replaceable by equivalents, which perform the same function, even if the structure or acts are different, as known in the art. The scope of the present invention is defined only by the claims which follow. When used in the following claims, the terms "comprise include", "have" and their conjugates mean "including but not limited to".

The invention claimed is:

1. A method for the interception and analysis of an at least one web based messaging communication, the method comprising the steps of:
   receiving an at least one detection scheme, the detection scheme used for determining a probability that a web site associated with an at least one HTTP content item provides web based mail services, and that the at least one HTTP content item represents a web based messaging communication having a proprietary format; and
   receiving an at least one analysis scheme, the analysis scheme used for parsing the at least one HTTP content item representing the web based messaging communication.

2. The method of claim 1 wherein the at least one HTTP content item is a web page.

3. The method of claim 1 wherein the at least one HTTP content item is an uploaded parameter.

4. The method of claim 1 wherein the at least one web based messaging communication is a saved draft.

5. The method of claim 1 wherein the at least one web based messaging communication is a retrieved draft.

6. The method of claim 1 wherein the at least one web based messaging communication is sent.

7. The method of claim 1 wherein the at least one web based messaging communication is received.

8. The method of claim 1 further comprising a step of automatically generating the at least one detection scheme.

9. The method of claim 1 further comprising a step of automatically generating the at least one analysis scheme.

10. The method of claim 1 wherein the at least one detection scheme is a detection script.

11. The method of claim 1 wherein the at least one detection scheme is a detection configuration file.

12. The method of claim 1 wherein the at least one analysis scheme is an analysis script.

13. The method of claim 1 wherein the at least one analysis scheme is an analysis configuration file.

14. The method of claim 1 wherein the at least one detection scheme comprises an at least one rule for identifying an address as associated with the at least one web based messaging communication.

15. The method of claim 14 wherein the address is a Uniform Resource Locator.

16. The method of claim 14 wherein the address is a host name.

17. The method claim 14 wherein the address is an IP address.

18. The method of claim 1 wherein the at least one analysis scheme contains an association of an at least one part of an at least one HTTP message representing a web based messaging communication with an at least one string.

19. The method of claim 18 wherein the at least one part of the at least one HTTP message relates to one or more of the group consisting of: a "TO" field, a "FROM" field, a "SUBJECT" field, a "CC" field, a "BCC" field, a "NICKNAME" field, a "USERID" field, a "ATTACHMENT" field, and a "BUDDIES" field.

20. The method of claim 1 further comprising the step of intercepting an at least one part of an at least one web based messaging communication.

21. The method of claim 1 further comprising the step of detecting according to the at least one detection scheme whether an at least one web page represents a web based messaging communication.

22. The method of claim 1 further comprising the step of detecting according to the at least one detection scheme whether an at least one uploaded parameter represents a web based messaging communication.

23. The method of claim 1 further comprising the step of parsing an at least one part of an at least one web based messaging communication according to the at least one analysis scheme.

24. The method of claim 1 further comprising a step of extracting an association of a unique user ID with a nick name.

25. The method of claim 24 wherein the unique user ID is an e-mail address.

26. The method of claim 1 further comprising a step of emulating a server for presenting the at least one web based messaging communication.

27. The method of claim 1 further comprising a step of intercepting an at least one detail selected from the group consisting of: user name, login name, and password.

28. The method of claim 1 further comprising a step of denoting an at least one parameter as an indication for aggregation of at least two components of the at least one web based messaging communication.

29. The method of claim 1 wherein the HTTP content item is a HTTP e-mail message.

30. An apparatus for interception and analysis of an at least one web based messaging communication, the apparatus comprising:
- an at least one address list repository;
- an at least one web based messaging communication detection scheme repository for storing an at least one web based messaging communication detection scheme, the web based messaging communication detection scheme used for determining a probability that a web site associated with an at least one HTTP content item provides web based mail services, and that the at least one HTTP content item represents a web based messaging communication having a proprietary format;
- a web based messaging communication detection engine for applying the web based messaging communication detection scheme,
- an at least one web based messaging communication analysis repository for storing at least one web based messaging communication parsing scheme, the web based messaging communication analysis scheme used for parsing the at least one HTTP content item representing a web based messaging communication having a proprietary format; and
- an at least one web based messaging communication analysis engine for activating the at least one web based messaging communication analysis scheme or pattern.

31. The apparatus of claim 30 wherein the at least one web based messaging communication is a saved draft.

32. The apparatus of claim 30 wherein the at least one web based messaging communication is a retrieved draft.

33. The apparatus of claim 30 wherein the at least one web based messaging communication is sent.

34. The apparatus of claim 30 wherein the at least one web based messaging communication is received.

35. The apparatus of claim 30 wherein the at least one address list repository stores an at least one Uniform Resource Locator.

36. The apparatus of claim 30 wherein the at least one address list repository stores an at least one host name.

37. The apparatus of claim 30 wherein the at least one address list repository stores an at least one IP address.

38. The apparatus of claim 30 wherein the at least one web based messaging communication detection scheme is a script.

39. The apparatus of claim 30 wherein the at least one web based messaging communication detection scheme is a configuration file.

40. The apparatus of claim 30 wherein the at least one web based messaging communication analysis scheme is a script.

41. The apparatus of claim 30 wherein the at least one web based messaging communication analysis scheme is a configuration file.

42. The apparatus of claim 30 further comprising a component for automatically generating an at least one web based messaging communication detection scheme.

43. The apparatus of claim 30 further comprising a component for automatically generating an at least one web based messaging communication analysis scheme.

44. The apparatus of claim 30 wherein the web based messaging communication is web mail.

45. The apparatus of claim 30 wherein the web based messaging communication is instant messaging.

46. The apparatus of claim 30 wherein the web based messaging communication is news group messaging.

47. The apparatus of claim 30 wherein the HTTP content item is a HTTP e-mail message.

48. A computer readable storage medium containing a set of instructions for a general purpose computer, the set of instructions comprising:
- receiving an at least one detection scheme, the detection scheme used for determining a probability that a web site associated with an at least one HTTP content item provides web based mail services, and that the at least one HTTP content item represents a web based messaging communication having a proprietary format; and
- receiving an at least one parsing scheme, the analysis scheme used for parsing the at least one HTTP content item representing the web based messaging communication.

* * * * *